Feb. 26, 1924. 1,485,164
T. CARROLL
MEANS FOR INDICATING THE LIQUID CONTENT OF DISTANT TANKS AND THE LIKE
Filed Jan. 3, 1922 2 Sheets-Sheet 1

Feb. 26, 1924.

T. CARROLL 1,485,164

MEANS FOR INDICATING THE LIQUID CONTENT OF DISTANT TANKS AND THE LIKE

Filed Jan. 3, 1922   2 Sheets-Sheet 2

Inventor
Thomas Carroll,

Witness:
Robert F. Beck

By Allen F. Beck.
Attorney

Patented Feb. 26, 1924.

1,485,164

UNITED STATES PATENT OFFICE.

THOMAS CARROLL, OF LANGLEY FIELD, VIRGINIA.

MEANS FOR INDICATING THE LIQUID CONTENT OF DISTANT TANKS AND THE LIKE.

Application filed January 3, 1922. Serial No. 526,660.

*To all whom it may concern:*

Be it known that I, THOMAS CARROLL, a citizen of the United States of America, and a resident of Langley Field, county of Elizabeth City, Virginia, have invented certain new and useful Improvements in and Relating to Means for Indicating the Liquid Content of Distant Tanks and the like, of which the following is a specification.

This invention relates to means for indicating the liquid content of distant tanks and the like; and the nature and objects of the invention will be readily understood and appreciated by those skilled in the arts involved in the light of the following explanation and detailed description of the accompanying drawings illustrating what I at present consider to be the preferred embodiments or mechanical expressions of the invention from among various other forms, arrangements, combinations and constructions within the spirit and scope thereof.

The present invention is directed to the provision of means for determining and indicating at points remote or distant from a tank or other container, the quantity or supply of liquid within the tank or container; and the invention deals with particularly, the provision of such means for use and operation on and in connection with the fuel supply systems of internal combustion motor propelled vehicles, which latter term is employed in a broad, generic sense to include all types of motor propelled vehicles, such for example, as air craft, automobiles or land vehicles, and boats.

The fuel supply systems of internal combustion motor propelled vehicles include fuel supply tanks or main fuel reservoirs which are mounted and located at points remote or distant from or at points not readily accessible to the operators of such vehicles, due to structural and design requirements, as well as for safety and expediency, so that, it is practically impossible for the operators or drivers of such vehicles to determine the quantity or supply of fuel in the tanks or reservoirs during operation of the vehicles. Various devices and mechanisms have been devised of the mechanical float or liquid level controlled type, which are adapted to be mountel on a tank or reservoir for indicating at the tank or reservoir, the supply or quantity of fuel therein, but these various mechanically operated, tank mounted devices have been found in practice to be exceedingly unreliable and inefficient due to continual inaccuracy, breakage and stoppage caused by the considerable shocks, jars and vibration to which they are subjected in use on a vehicle fuel tank or reservoir. Further, these various tank mounted devices give a reading or indication at the tank only, so that, where, as is generally the case, the fuel tank of a vehicle is mounted on and in the vehicle at a point remote or distant from the operator's seat thereof, it is practically impossible for the operator to secure a reading or indication from the device without leaving his seat and the vehicle, which is not possible generally while the vehicle is in motion. The use of such indicating devices on a tank, with operating connections from the device to a point within normal view of the operator of a vehicle, is not practical because of the great shocks and vibration to which the comparatively delicate operating connections are subjected in use on and with a vehicle. Therefore, one of the primary objects of the present invention is the provision of means through the medium of which the quantity or supply of fuel in the fuel supply tanks or reservoirs of motor propelled vehicles can be indicated and determined at points remote or distant from the fuel tanks of such vehicles, and which indicating means will be reliable and efficient in operation and unaffected by vibration and shocks to which it may be subjected in use and operation on and in connection with motor propelled vehicles.

A further object of this invention is the provision of means for indicating the quantity or supply of liquid in a tank or other container, at points remote or distant from the tank or container, in which indicating means the use of mechanically operating devices or other mechanisms employing moving elements or parts are eliminated, in order to reduce the possibility of breakage and stoppage to a minimum and to increase the reliability and efficiency of such indicating means in operation and use under all conditions.

A further object of this invention is to provide means adapted to be mounted on a motor propelled vehicle within the normal range of vision of the operator thereof, for visibly indicating the quantity or supply of fuel in a fuel supply tank or reservoir mounted on and in the vehicle remote from or inaccessible to the operator thereof, and which indicating means is so constructed and arranged as to be normally inoperative and adapted to be operated to give an indication or reading only when it is desired to ascertain the quantity or supply of fuel in the supply tank of the vehicle.

A further object of this invention is to provide means for indicating at points remote or distant from the fuel supply tanks or reservoirs of the fuel supply systems for internal combustion motor propelled vehicles, the quantity or supply of fuel within the fuel supply tank of a vehicle, which means is adapted to be operated by utilizing the condition or state of pressure present in the fuel supply system, or by utilizing a pressure condition created by the motor, so that the indicating means will be capable of installation on and in connection with fuel supply systems of both the pressure type and of the non-pressure type.

A further object of this invention is to provide means for indicating the quantity of liquid in a liquid supply tank or reservoir, which means embodies an indicator forming a surface whose length relatively represents the height or depth of the supply tank and a series of tubes mounted on and drawing from different levels in the tank and extending to and connected with the indicator in such a manner that liquid or air, as the case may be, can be drawn or forced from the level in the tank at which each tube is mounted and projected against the indicator surface at points along the length thereof relatively corresponding to the levels in the tank from which the tubes draw, respectively, whereby the approximate level of liquid in the tank is indicated by the relative length of liquid covered surface of the indicator.

A further object of the invention is to provide an indicator for determining the quantity or supply of fuel in the fuel tank or reservoir of a motor propelled vehicle, which indicator is adapted to be mounted and installed on a vehicle instrument board remote or distant from the fuel supply tank, or at any other desired or suitable point on the vehicle, and operatively connected with the tank by a series of tubes, so that, fuel from the tank can be forced or drawn therefrom through the tubes to the indicator when it is desired to determine the quantity or supply of fuel in the vehicle supply tank.

A further object of this invention is the provision of means for indicating at points remote or distant from the fuel supply tanks or reservoirs of motor propelled vehicles, the quantity or supply of fuel in the tanks or reservoirs, which means consists of a small number of parts or elements of extremely simple construction and arrangement, which can be readily installed and operatively connected with all types of fuel supply systems of motor propelled vehicles, and in which units of the means can be removed and repaired or replaced without removing or disturbing the complete installation.

With the foregoing and various other objects in view, which will be readily apparent to and appreciated by those familiar with the arts involved, the invention consists in certain novel features in construction and in combinations and arrangements of elements as more fully and particularly set forth and specified hereinafter.

Referring to the accompanying drawings.

In the use and operation of aircraft, particularly of the heavier-than-air or airplane type, the various problems hereinbefore referred to as attendant the provision of means for indicating, at points remote or distant from the fuel supply tanks or reservoirs of motor propelled vehicles the quantity or supply of fuel in the tanks or reservoirs, are met with and encountered in their most acute and extreme form. This is due to the fact that, vibration in airplanes is generally very great, the structure and design of airplanes require the mounting and installing of the fuel supply tanks at points remote from or inaccessible to the pilots thereof, and the further circumstance that during operation thereof it is impossible for the pilots to reach the tanks to determine the quantity or supply of fuel, as well as various other facts well known and understood by those familiar with the operation and piloting of aircraft. Hence, in the accompanying drawings, the present invention is illustrated installed on and in connection with an airplane and the several types of fuel supply systems in general use therefor, and purely by way of an example to more clearly bring out the various problems solved and overcome by the invention through this illustrated application of one form and embodiment thereof.

However, it is to be understood, as is clearly apparent, that the invention is applicable to all types of motor propelled vehicles, as well as capable of various other applications where it may be desired to indicate and determine the quantity or supply of liquid in a tank, reservoir or other container.

Figure 1:
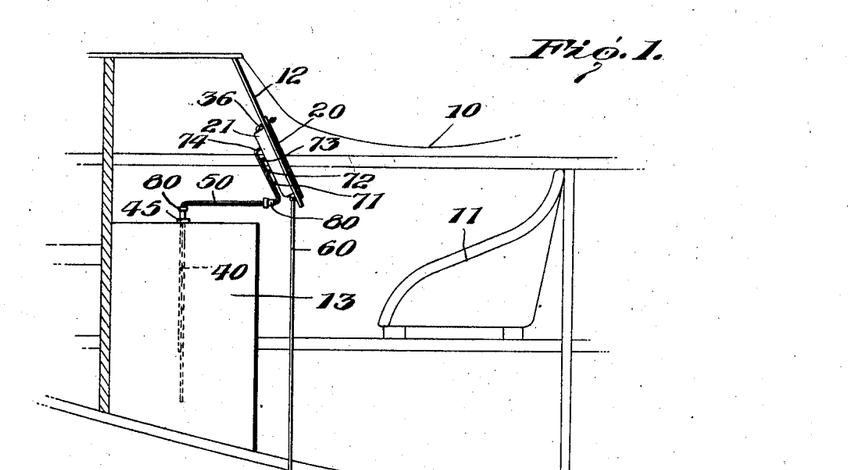
Fig. 1 is a view more or less diagrammatical, showing an installation of the indicating means of the invention on and in connection with a fuel supply system of the pressure type mounted in an airplane, a portion of the fuselage, instrument board, and main fuel supply tank of the airplane being shown.

The accompanying drawings illustrate the application of the indicating means of the invention to an airplane fuel supply system of the pressure type, and to an airplane fuel supply system of the non-pressure type. In Fig. 1 of the drawings, the application of the invention to a pressure fuel supply system is disclosed, and illustrates diagrammatically a portion of the fuselage 10 of an airplane provided with a pilot's seat 11, instrument board 12, and the fuel supply tank 13 of a pressure operated fuel supply system. The invention includes an indicating instrument or gauge 20 mounted upon the instrument board 12 of the airplane within the normal range of vision of a pilot when in the seat 11, a series of level tubes 40 mounted in the tank 13 and depending therein to different depths or levels, respectively, a series of tubes forming a manifold 50 connecting the level tubes 40 with the gauge 20, and a discharge or drain tube 60 extending from the gauge 20 downwardly through the fuselage 10 and extending outwardly therethrough and discharging to atmosphere.

Figures 2, 3, 6:
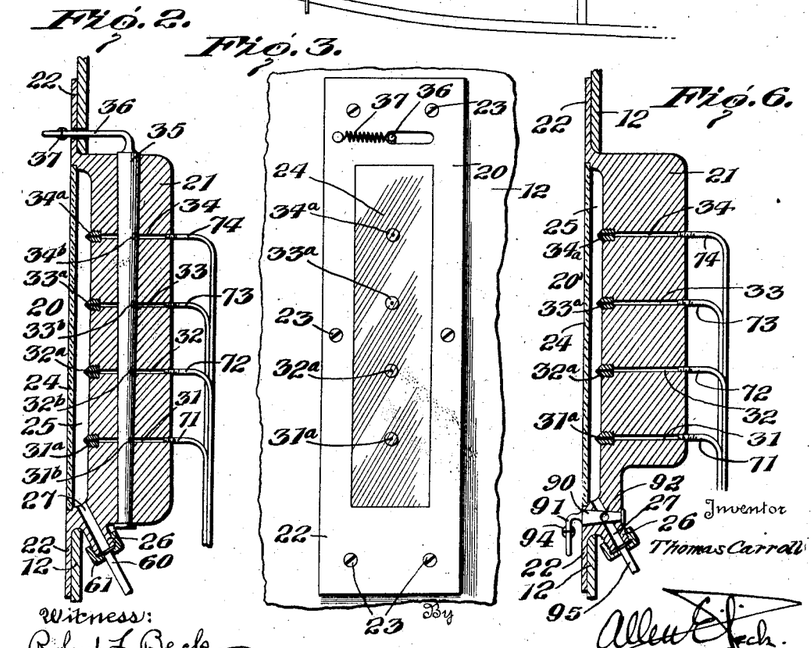
Fig. 2 is a vertical longitudinal section of the indicator of the invention shown as mounted on the airplane instrument board of Fig. 1.
Fig. 3 is a front elevation of the indicator of the invention as shown in Fig. 2.
Fig. 6 is a vertical longitudinal section through the indicator of the invention adapted for use with a non-pressure fuel system of the type illustrated in Fig. 5, and shown mounted on the instrument board of an airplane.

The indicating instrument or gauge 20 of the form and embodiment adapted for use with a fuel supply system of the pressure type is illustrated in Figs. 2 and 3 of the accompanying drawings, and comprises a rectangular block or body 21 having the opposite side and end flanges 22 extending laterally from one face thereof to provide for attaching the gauge on and to an instrument board or the like, by means of bolts or screws 23 (see Fig. 3). The flanged or front face of the gauge block 21 is depressed or channelled out and a plate of ground glass 24, or any other suitable material, is fitted and secured over and across the channelled out face of the block 21, with the ground or roughened face thereof placed inwardly. The plate of ground glass 24, completely covers the depressed or channeled out face of the block 21 and is secured thereon and thereover to provide an air and liquid tight fit with the block and thereby forms an air tight chamber 25 within the block and beneath the glass 24. At one end of the block 21 a downwardly and rearwardly inclined and externally threaded neck 26 extends, which is provided with a bore 27 extending therethrough in communication with the adjacent end of the chamber 25. A series of spaced, transverse bores, in the present instance four in number, are provided extending through the block 21 at substantially right angles to the plane of the ground glass plate 24. These bores 31, 32, 33 and 34 extend through the block and are equally spaced apart along the longitudinal center of the chamber 25 and block 21. The inner or discharge ends of the bores 31, 32, 33 and 34 are provided with the jet forming nozzles or plugs 31$^a$, 32$^a$, 33$^a$, and 34$^a$, respectively, screw threaded or otherwise suitably mounted therein.

A multiple valve is rotatably mounted longitudinally of the block 21 and extends longitudinally therethrough at substantially right angles to and intersecting the series of bores 31, 32, 33 and 34. The valve 35 is provided with a series of transverse bores 31$^b$, 32$^b$, 33$^b$ and 34$^b$, adapted to aline with the block bores 31, 32, 33 and 34, respectively, when the valve 35 is rotated to open position. With the valve rotated to closed position with the bores therethrough out of alinement with the block bores, the valve body shuts or closes the block bores against communication with the chamber 25. One end of the valve 35 is extended beyond the block 21 and is provided with a lateral operating arm or lever 36 extending through an elongated slot formed in the adjacent end flange 22, and a similar slot or other opening formed through the support upon which the gauge 20 is mounted (see Fig. 2). The operating arm or lever 36 extends forwardly beyond the gauge 20 and is secured and attached to a suitable spring 37 mounted on the gauge and arranged to normally maintain the valve 35 in closed position with the bores therethrough out of alinement with, and the valve body closing, the block bores 31, 32, 33 and 34, respectively. The form and arrangement of multiple valve 35 illustrated is purely by way of example, and it is clear that different forms, and constructions of valve and different arrangements for mounting the same to simultaneously open and close the series of block bores can be utilized without departing from the spirit and scope of the invention.

The indicating instrument or gauge 20, constructed and arranged as above described for use and operation with a fuel supply system of the pressure type, is mounted on the instrument board 12 (see Fig. 1) by means of the flanges 22 and the bolts or screws 23, with the chamber 25 and ground glass plate 24 facing outwardly and visible from the pilot's seat 11, and with the block or body 21 of the gauge extending beneath or back of the instrument board 12. The gauge 20 is mounted on the instrument board 12 in substantially vertical position with the valve operating lever 36 on the upper end of the gauge and extending outwardly therefrom within reach from the seat 11, and with the end of the gauge having the neck 26 and passage 27, lowermost. The drain or discharge tube 60 is coupled and connected to the neck 26 in communication with the passage 27 and chamber 25 by means of an internally threaded sleeve 61 rotatably confined on the tube 60, in a manner well known and understood, and the tube extends downwardly through the fuselage a distance outwardly therefrom where it is open and discharges to atmosphere. The series of block bores 31, 32, 33 and 34, of the gauge 20, are internally threaded at their outer ends at the rear of the gauge body 21, and a series of tubes 71, 72, 73 and 74, having their ends externally threaded, are mounted securely in and providing an air and liquid tight joint with the block bores 31, 32, 33 and 34, respectively. These tubes 71, 72, 73 and 74, extend outwardly and depend a distance downwardly from the rear of the gauge block, and terminate adjacent the lower end thereof, there they are mounted and secured in a coupling or union 80 which maintains the tubes in proper, fixed position, as clearly shown in Fig. 1, of the drawings.

Figure 4:
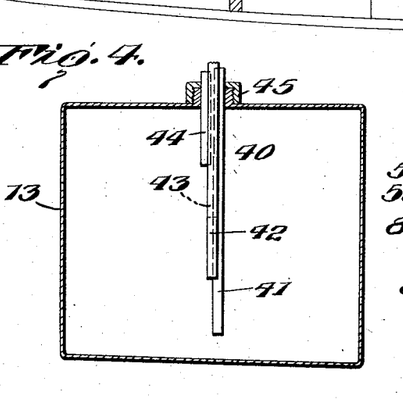
Fig. 4 is a vertical section through a fuel supply tank and showing the mounting and arrangement of level tubes extending into the tank and forming the tank unit of the indicating means of the invention.

The fuel supply tank 13 is provided with a unit 40, comprising a group of tubes 41, 42, 43 and 44, which are mounted in the tank and extend to different, predetermined depths or levels therein, respectively. In the illustrated example these level tubes are mounted in proper assembled position in a fitting 45 secured on the top of the tank and through which the level tubes 41, 42, 43 and 44 extend a distance thereabove where they are secured and mounted in proper fixed position by a union 80. The tubes extend downwardly into the tank 13, to different predetermined levels, for instance, in the present example the tubes are four in number and divide the tank in effect into "quarters," that is, tube 41 extends to the lowest level, which is substantially "one-quarter" the depth of the tank; tube 42 extends to a higher level, approximately at "one-half" the depth of the tank; tube 43 extends to a higher level than the tube 42, approximately a level "three quarters" of the depth of the tank; and tube 44 extends to the highest level of the series, that is, a point below the top of the tank but above the "three-quarter" level therein, as shown in detail in Fig. 4 of the accompanying drawings.

The series of tank level tubes 41, 42, 43 and 44 are connected with the series of gauge tubes 71, 72, 73 and 74, respectively, by means of a manifold 50.

Figures 7, 8, 9:
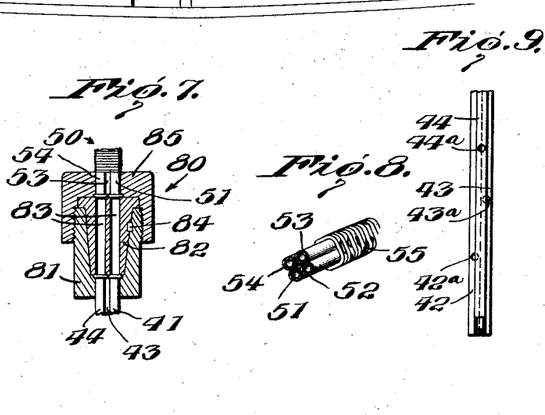
Fig. 7 is a vertical section through a union adapted to operatively connect the units of tubes of the means of the invention.
Fig. 8 is a detail perspective of a portion of the unit of tubes forming the manifold connecting a fuel tank with the indicator of the invention.
Fig. 9 is a detail view of a modified construction of the tank level tubes forming the tank unit of the invention.

In the present instance, the manifold 50 comprises a series of four tubes 51, 52, 53 and 54, bound together by wrapping fine wire therearound, which wire can be soldered or otherwise suitably fastened at intervals, as shown in detail in Fig. 8 of the drawings. One end of the manifold 50 is mounted and secured in the tank union 80 with the tubes 51, 52, 53, and 54 in communication with the tank level tubes 41, 42, 43, and 44, respectively, and the other end of the manifold 50 is mounted and secured in the gauge union 80 with the manifold tubes 51, 52, 53 and 54 in communication with the gauge tubes 71, 72, 73 and 74, respectively. Thus it is seen that the level tubes 41, 42, 43 and 44 are in communication with the gauge bores 31, 32, 33 and 34, respectively, through the manifold 50 and the tubes 71, 72, 73 and 74, respectively. In this manner the lowest level tube 41 is in communication with the lowest gauge bore 31 which discharges into the lower end of the gauge chamber 25; the next highest level tube 42 with the next highest gauge tube 32; the next highest level tube 43 with the next highest gauge bore 33; and the highest level tube 44 in communication with the top or uppermost gauge bore 34 which discharges into the upper end of the gauge chamber 25.

In Fig. 7 of the drawings, one form and construction of tube coupling or union 80 is disclosed, although it is to be understood that any suitable or desired union may be utilized to connect the tubes in proper relation, or if desired the unions 80 can be dispensed with and the tubes 71, 72, 73 and 74 can extend directly to and connect with the proper level tubes in the tank. The type of the union 80 illustrated herewith comprises a socket member 81 adapted to receive the ends of a set of tubes, for example, the level tubes 41, 42, 43 and 44, and a plug 82 which fits into the socket member 81 and is provided with a series of longitudinal bores 83 adapted to register and communicate with the ends of the tubes mounted in the socket member. A suitable key or other locking means 84 is provided between the socket member 82 and the plug 84. A binding sleeve or cap 85 is adapted to receive another set of tubes, such as the manifold tubes 51, 52, 53 and 54, and to be screwed down upon the socket member 81 and the plug 82, with the manifold tubes secured and maintained in proper registry with the longitudinal bores 83 and the tubes in the socket member with which the bores 83 are in proper communication, respectively. By the use of a similar union 80 connecting the gauge tubes 71, 72, 73 and 74 with the other end of the manifold 50 and the tubes comprising the same, the proper registry between the gauge tubes and the manifold tubes may be secured to obtain the required relative communication between the level tubes and the gauge tubes, respectively. The unions 80 are so arranged that the socket members receive the gauge tubes and the level tubes, respectively, and by means of the keyed plugs having the bores therethrough, maintain the level tubes and gauge tubes in proper fixed relation, so that, by unscrewing the binding sleeves or caps 85 from the respective unions 80 the manifold can be removed for replacement or repair without deranging or disturbing the installation of the gauge 20 or tank unit 40. Then, when a manifold is replaced it is only necessary to screw the caps to the respective unions and the manifold will properly connect and place in required communication, the level tubes of the tank unit 40 and the gauge tubes of the indicating instrument or gauge 20, respectively.

The installation of the means of the invention, as illustrated in Fig. 1 of the drawings, on and to a pressure fuel supply system, depends upon and utilizes the positive pressure maintained in the fuel supply tank 13 to operate the gauge or indicating instrument 20 to give an indication of the approximate fuel supply in the tank 13. In operation and use, the gauge 20 of the invention is maintained normally inoperative by the spring 37 which holds the operating valve 35 in position closing the gauge bores 31, 32, 33 and 34. The positive pressure in the tank forces fuel into the level tubes immersed therein and through the manifold 50 and gauge tubes 71, 72, 73 and 74 into the gauge bores 31, 32, 33 and 34. When it is desired to determine the supply of fuel in the tank 13, the operating lever 36 is turned against the tension of spring 37 to rotate the valve 35 to open position with the bores $31^a$, $32^a$, $33^a$ and $34^a$, alined with the gauge bores 31, 32, 33 and 34, respectively. The pressure in the tank then forces fuel through the gauge bores and the nozzles $31^b$, $32^b$, $33^b$, and $34^b$ secured in the inner ends thereof, respectively, against the ground surface of the glass plate 24 opposite these nozzles. The nozzles $31^b$, $32^b$, $33^b$ and $34^b$, form the fuel passing therethrough into fine jets which are projected by the tank pressure across the chamber 25 and against the ground glass plate 24. The fuel projected against the inner ground or roughened face of the glass plate 24, spreads out thereover and wets the portions thereof around and adjacent the points of contact of the projected jets from the nozzles of the gauge bores, so that, from the front or outside of the gauge the glass plate will present a clouded or wet appearance at those portions in front of the gauge bores from which jets of fuel are projected. If the fuel tank is approximately full and all of the level tubes of the tank unit 40 are submerged or immersed in fuel at their intake ends, then when the operating valve 35 is opened the tank pressure will force fuel through the level tubes, the manifold, gauge tubes and gauge bores and nozzles connected therewith, and jets of fuel will be projected from all the nozzles against the glass plate to substantially wet the same throughout the length or height of the plate and thus indicate that the tank is approximately full. Now, if the supply of fuel in the tank is below the level of the intake ends of the upper level tubes 43 and 44, then when the valve 35 is opened the tank pressure will force only air through the level tubes 43 and 44, and as these tubes are always connected by the manifold tubes 53 and 54 to and in communication with the gauge bores 33 and 34, respectively, at the upper half of the gauge block 21, the nozzles $33^a$ and $34^a$ thereof, respectively, will project air against the upper half of the glass plate 24, so that the portions of the plate 24 in front of the upper nozzles will be dry. The lower level tubes 41 and 42 will be below the level of and immersed in the fuel in the tank, and fuel will be projected from the lower gauge bores 31 and 32, and nozzles $31^a$ and $32^a$, respectively, connected therewith, against the lower half of the plate 24, which will be clouded or wet thereby and indicate by the line between the wet lower portion and dry upper portion, the approximate level of the fuel, or the supply thereof, in the fuel supply tank 13. The indicator plate 24 represents in height or length the relative depth of the supply tank 13, and as the gauge bores 31, 32, 33 and 34 are arranged in the same relative position along the length of the plate 24, as the respective depths or levels in the tank 13 to which the level tubes 41, 42, 43 and 44 extend, with which tubes the gauge bores are respectively connected, it is apparent that the relation between the wet and dry portions of the indicator plate 24, or the proportion of said plate showing wet, will indicate and determine the approximate fuel content of the tank.

In a similar manner, the approximate fuel content will be indicated wherever the level of the fuel may be, those level tubes above the fuel drawing air which is projected onto and maintains dry the corresponding portion of the indicator plate 24, while those level tubes immersed in the fuel will draw fuel from the tank which is projected onto and wets that portion of the indicator plate corresponding to the level or depth of fuel in the tank. If the supply of fuel in the tank falls below the level of the lowermost level tube then the indicator plate will show dry throughout when the operating valve is opened and thus indicate to the operator that the supply of fuel is practically exhausted.

After opening the operating valve 35 and maintaining the same in open position a sufficient length of time to secure the indication on the indicator plate 24, as above described, the valve lever 36 is released and the spring 37 returns the valve to normal closed position. In operation and use of the invention as described, it may be necessary to disregard the indication on the glass plate the first few seconds after opening the valve, as fuel may have been left and collected from the previous operation in those gauge bores through which air will be forced. However, such collection of fuel will be cleared out in a few seconds, after which the true indication will be given on the indicator plate. The fuel discharged onto the indicator plate 24 drains and collects in the lower end of the indicator chamber 25 from which point it is drained by the tube 60 to the outside of the fuselage and there discharged to atmosphere.

Figure 5:
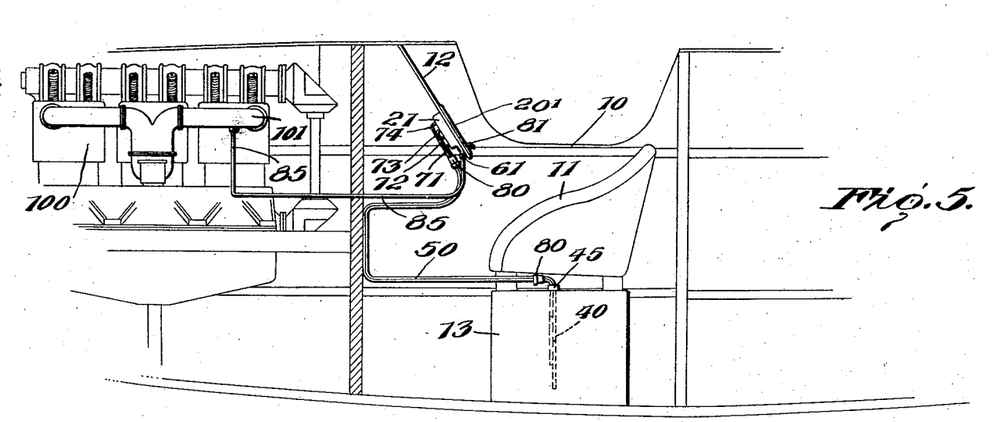
Fig. 5 is a view, more or less diagrammatically, of the indicating means of the invention connected and installed on and with a fuel supply system of the non-pressure type mounted in an airplane, a portion of the fuselage of the airplane, and the motor, main fuel tank and instrument board thereof being more or less diagrammatically shown.

The installation of the invention on and to a fuel supply system of the non-pressure type is illustrated in Fig. 5 of the accompanying drawings, and a form and embodiment of indicating instrument or gauge adapted for this installation is illustrated in Fig. 6 of the drawings.

Referring particularly to Fig. 5, a portion of an airplane fuselage 10 is diagrammatically illustrated and discloses the pilot's seat 11, instrument board 12, non-pressure fuel tank 13 and the power unit or motor 100, all mounted on and in the fuselage in the usual or any other desired manner, well known and understood by those skilled in the art. The indicating instrument or gauge 20′ adapted for installation with a non-pressure fuel system is illustrated in Fig. 6 and conforms substantially to the construction of the gauge 20 illustrated and described in connection with the pressure type of fuel system. This non-pressure embodiment of gauge 20′ comprises the gauge body or block 21, attaching flanges 22 and depressed or channelled out portion tightly covered and sealed by the ground glass plate 24 to form the air and liquid tight chamber 25. The gauge 20′ is formed with the series of guage bores 31, 32, 33 and 34 having the nozzles 31ª, 32ª, 33ª and 34ª mounted in the inner or chamber ends thereof, respectively, and the gauge tubes 71, 72, 73 and 74, mounted in the outer or rear ends of the gauge bores, respectively.

In this form or embodiment of the indicating instrument the multiple operating valve 35 is omitted and an operating valve 90 is mounted in the lower end of the gauge block 21 and through the discharge or drain passage 27 in the neck 26. This valve 90 is in the form of a rotatable plug or conical valve having a transverse bore 92, therethrough, which in open position of the valve 90 is alined with the passage 27, and which in closed position of the valve is out of alinement and communication with the passage 27, with the body of valve 90 closing the passage 27. The valve 90 is provided with an operating lever or handle 91 which is secured to a spring 94 normally maintaining the valve in closed non-operating position. The gauge 20′ is mounted on the instrument board 12 in a manner similar to the mounting of gauge 20 in the pressure installation, with the gauge tubes 71, 72, 73, and 74 collected and assembled in a union 80.

A manifold 50 connects the gauge tubes with and leads to the non-pressure tank 13 in which a tank unit 40 composed of level tubes 41, 42, 43 and 44, is mounted and which is connected to the manifold by means of another union 80. The foregoing mounting and arrangement is similar to and has been described in detail with reference to the pressure installation shown in Fig. 1.

However, in the installation of the invention to a fuel supply system of the non-pressure type, some agent must be utilized in place of pressure in the fuel tank to project fuel onto the indicator plate. In the present instance, the suction of the intake manifold of the motor is used as an agent to create sub-atmospheric pressure in the chamber 25 and thereby cause fuel or air as the case may be, to be drawn through the level tubes, manifold 50, and gauge tubes and bores. The neck 26 and passage 27 of the gauge 20′ are connected and placed in communication with a tube 95, in the usual manner by means of a sleeve 61, and the tube 95 leads to and is connected into the intake manifold 101 of the motor 100. Thus, it is seen that by opening valve 90, with the motor 100 in operation, the suction created in the intake manifold 101 will establish sub-atmospheric pressure, through the tube 95, indicator 20′, manifold 50, and level tube unit 40, in the tank 13, and that fuel and air will be drawn into and through the level tubes and their connections to the gauge 20' and there be projected by the gauge nozzles onto and against the indicator plate 24. The operation of the gauge 20' is similar to that of the pressure type 20, and the resulting indication on the glass plate 24 will determine the quantity or supply of fuel in the non-pressure tank 13. The valve 90 is maintained normally closed by the spring 94, and the gauge is operated by manually opening and maintaining the valve open against the tension of this spring until a reading is obtained on the gauge glass 24. In this form of the gauge the reading when the valve is first opened tends to be inaccurate until whatever fuel may have collected in the connecting tubes is blown out.

It will be noted that the form of gauge, such as 20', adapted for non-pressure system installation may be utilized with pressure systems where the gauge 20' is mounted and installed above the pressure fuel tank so as to avoid all syphonic action and drainage of fuel into the gauge chamber 25. With this type installed with a pressure system the operation is the same, as by opening the valve 90 the pressure in the tank will force fuel and air into the gauge and onto the indicator plate. Further, in either type of gauge described, the operating agent can be provided by other means than tank pressure or motor intake suction, as for example, a separate pump or the like, operated by the motor or by a wind motor or some similar source of power.

In Fig. 9 of the drawings, a modification of the tank unit 40 is illustrated, in which the level tubes 41, 42, 43 and 44 are all of the same length and tube 41 is open at the lower end thereof, while tubes 42, 43, and 44 are provided with the apertures 42ª, 43ª, and 44ª therethrough, respectively, at different levels in the tank, and the lower ends of these tubes are plugged, capped or otherwise closed. It will be apparent that various other constructions and arrangements of the tank unit 40 for drawing fuel or air from different levels in a tank may be utilized, than the construction and arrangements shown and described.

Thus, from the foregoing it is seen that the pilot of an airplane, or driver of any other vehicle having the invention installed thereon, can obtain an indication of the approximate supply of fuel without leaving the pilot's seat, by opening the operating valve of the indicator of the invention mounted on the instrument board, or at any other desired point within normal range of vision. The invention does not include moving parts or elements, other than the operating valve, so that the effect of shocks, vibration and such strains do not affect the same, and a positive reliable operation and indication is assured with minimum possibility of breakage or non-functioning from any cause and under all conditions.

Any desired number and arrangement of level tubes and gauge bores arranged relatively with respect thereto, may be utilized and the invention is capable of a variety of changes and rearrangements to meet the requirements of each installation, mounting and use to which it may be adapted.

It is evident that various changes, modifications and variations might be resorted to without departing from the spirit and scope of my invention and hence I do not wish to limit myself to the exact disclosures hereof.

Desiring to protect my invention in the broadest manner legally possible, what I claim is:

1. Means for indicating the liquid content of distant tanks, comprising an indicating instrument adapted to be mounted remote from a liquid supply tank, a series of tubes adapted to communicate with different predetermined levels within the tank respectively, and the said tubes connected with and discharging into said indicating instrument at points relatively arranged in position to correspond to the relative position of the different levels, respectively, in the tank with which said tubes are in communication.

2. Means for indicating the liquid content of distant tanks, comprising an indicating instrument having a visible surface the length of which represents the depth of a tank, and means for projecting liquid from a tank onto a portion of said surface relatively proportionate to the depth of liquid in the tank.

3. Means for indicating the liquid content of distant tanks, comprising a visible surface the length of which represents the depth of a tank, and means for moistening a proportionate portion of the length of said surface corresponding to the proportionate depth of liquid in a tank.

4. Means for indicating the liquid content of distant tanks, comprising a visible surface the length of which represents the depth of a tank, and means for projecting liquid from a supply tank onto a proportionate portion of the length of said surface corresponding to the proportionate depth of liquid in the tank, and for projecting air on the remaining portion of the length of said surface.

5. Means for indicating the liquid content of distant tanks, comprising an indicating instrument, means adapted to be mounted in communication with different predetermined levels in a supply tank connected with and discharging into said indicating instrument at a series of points relatively arranged to correspond to the relative position of the predetermined levels respectively, in the supply tank, and means for utilizing a difference between the tank pressure and the indicating instrument pressure for forcing liquid from the tank through said connecting means to and discharging the same into said instrument.

6. Means for indicating the liquid content of distant tanks, comprising an indicating instrument, a series of tubes adapted to communicate with different predetermined levels, respectively, of a supply tank, and a series of jet forming nozzles mounted in said instrument in relative position therein corresponding to the relative position of the predetermined tank levels, respectively, the said nozzles connected with said tubes, respectively, and discharging into said indicating instrument.

7. Means for indicating the liquid content of distant tanks, comprising an indicating instrument provided with a visible indicating surface, and means adapted to be mounted on a supply tank in communication with different predetermined levels therein for discharging liquid from the different levels in said tank onto said visible indicating surface by utilizing differential pressure between the tank and indicating instrument.

8. Means for indicating the liquid content of distant tanks, comprising an indicating instrument provided with a visible indicating surface the length of which represents the depth of a supply tank, and means adapted to be mounted in communication with different predetermined levels in a supply tank for discharging liquid from the tank onto a proportionate portion of the length of said indicating surface corresponding to the proportionate depth of liquid in the supply tank.

9. Means for indicating the liquid content of distant tanks, comprising an indicating instrument provided with a visible indicating surface representing in length the depth of a supply tank, a series of discharge nozzles mounted in said instrument for discharging onto said surface at a series of points spaced along the length thereof, and means adapted to be mounted in communication with different predetermined levels in a supply tank, the said means connected with and placing said series of instrument discharge nozzles in communication with the predetermined tank levels, respectively, whereby liquid can be discharged from the tank levels by said nozzles onto a portion of the length of said indicating surface proportionate to the depth of liquid in a supply tank.

10. Means for indicating the liquid content of distant tanks, comprising an indicating instrument provided with a visible indicating surface and a series of discharge nozzles arranged to discharge onto said surface at points spaced along the length thereof, means adapted to be mounted in communication with different predetermined levels in a supply tank and connected with and placing said discharge nozzles in communication with the predetermined tank levels, respectively, and means normally inoperative for utilizing a differential pressure between a supply tank and said indicating instrument to conduct liquid from the tank and discharge the same onto said indicating surface.

11. Means for indicating the liquid content of distant tanks, comprising an indicating instrument having a series of bores therein, a tank unit consisting of a series of tubes adapted to be mounted in a tank in communication with different levels therein, the said instrument bores arranged in said instrument in relative position corresponding to the tube levels in the tank, a manifold for connecting the bores of said indicating instrument with the tubes of said tank unit, respectively, and unions mounted on said tank unit and said instrument, respectively, the said unions adapted to detachably receive said manifold and maintain the same in position connecting the tubes of the tank unit with the proper bores, respectively, of the indicating instrument.

12. In an indicating instrument, a block forming the body of the instrument and having one face thereof depressed, a transparent plate mounted on said block across said depressed face and forming a chamber therebeneath, a series of spaced bores formed through the block at substantially right angles to said transparent plate and opening into said chamber, and means for discharging liquid from different levels in a supply tank through said bores respectively.

13. In an indicating instrument a block forming the body of the instrument and having a depressed face, a transparent plate mounted on the block across said depressed face and forming a chamber within the block between said plate and the depressed face, a series of spaced bores formed through the block transversely of said depressed face and communicating with said chamber, a series of nozzles mounted in the chamber ends of said bores, respectively, and means for discharging liquid from different levels of a supply tank through said bores and nozzles, respectively, onto said transparent plate.

14. Means for indicating the content of distant tanks, comprising an indicating instrument having a chamber formed therewithin, a transparent plate mounted over and closing said chamber, the said plate representing the depth of a tank, a series of ducts in said instrument communicating with said chamber at points opposite said plate and spaced along the length thereof, means controlling passage through said ducts, and means adapted to be placed in communication with different levels of a tank for discharging the contents thereof through said ducts, respectively.

15. In means for indicating the liquid content of tanks, an indicating instrument including a substantially airtight visible indicating chamber, means adapted to be placed in communication with different levels in a tank discharging into said indicating chamber at points therein relatively corresponding to the respective tank levels, and means for controlling discharge from the said means in communication with the tank to said indicating chamber.

16. In means for indicating the liquid content of tanks, an indicating instrument providing an indicating chamber having a transparent wall, and means adapted to be placed in communication with different levels in a tank for discharging the contents thereof within said indicating chamber onto said transparent wall at points relatively corresponding to the levels in a tank with which said means is in communication, respectively.

17. In means for indicating the liquid content of tanks, an indicating instrument having a visible indicating chamber, means for discharging the contents of a tank from different predetermined levels into said indicating chamber at points therein relatively corresponding to the predetermined tank levels, respectively, and means for conducting liquid from said chamber.

18. In a device for indicating the liquid content of distant tanks, a series of tubes adapted to be mounted in communication with different levels, respectively, of a tank and to discharge on the exterior thereof, and means for causing discharge through said tubes from the respective tank levels with which the said tubes are in communication.

19. In a device for indicating the liquid content of distant tanks, a series of tubes adapted to be mounted in communication with different predetermined levels, respectively, of a tank, the said tubes adapted to discharge at visible points on the exterior of a tank, and normally inoperative means for causing discharge through said tubes from the respective tank levels with which the said tubes are in communication to the visible exterior discharge points thereof.

20. A device for indicating the liquid content of distant tanks, comprising means adapted to be mounted in communication with different levels in a tank, means for causing discharge through said level communicating means from the different levels, respectively, with which said means is in communication, and means responsive to the discharge from the different tank levels for visibly rendering an indication of the liquid content of a tank.

21. A device for indicating the liquid content of tanks, comprising a visible indicating surface, means adapted to be placed in communication with different predetermined levels in a tank for discharging onto said service at points thereon relatively corresponding to the tank levels, respectively, and means for causing discharge through said level communicating means.

22. A device for indicating the liquid content of tanks, comprising an indicating instrument, means adapted to be placed in communication with different predetermined levels in a tank for discharging into said instrument, and the said indicating instrument embodying means responsive to discharges from said tank level communicating means for indicating the level of liquid in a tank.

23. A device for indicating the liquid content of tanks, comprising an indicating instrument, means adapted to be placed in communication with different predetermined levels in a tank for discharging into said instrument, means normally inoperative for causing discharge through said level communicating means from a tank, and the said indicating instrument embodying means responsive to discharges from the said level communicating means for indicating the level of liquid in a tank.

24. A device for indicating the liquid content of distant tanks, comprising a visible indicating surface, means embodying a series of passages adapted to be placed in communication with different predetermined levels in a tank for discharging onto said surface at points relatively corresponding to the tank levels, respectively, and normally inoperative means for causing simultaneous discharge through the passages of said level communicating means from the respective tank levels.

25. A device for indicating the liquid content of distant tanks, comprising a visible indicating surface, means embodying a series of passages adapted to be placed in communication with different predetermined levels in a tank for discharging onto said surface at points relatively corresponding to the tank levels, respectively, and valve means normally closing the passages of said level communicating means against discharge therefrom, the said valve means operative to simultaneously open the said passages for discharge therethrough from the respective tank levels onto said visible indicating surface.

THOMAS CARROLL.